United States Patent [19]

Heng et al.

[11] Patent Number: 4,704,659

[45] Date of Patent: Nov. 3, 1987

[54] MODULAR ASSEMBLY FOR HOUSING ELECTRICAL APPARATUS

[75] Inventors: Jean-Paul Heng, Lyons; André Marmonier, Bron; Etienne Briguet, Rillieux la Pape, all of France

[73] Assignee: CGEE Alsthom, Levallois Perret, France

[21] Appl. No.: 873,039

[22] PCT Filed: Sep. 4, 1985

[86] PCT No.: PCT/FR85/00237

§ 371 Date: May 5, 1986

§ 102(e) Date: May 5, 1986

[87] PCT Pub. No.: WO86/01637

PCT Pub. Date: Mar. 13, 1986

[30] Foreign Application Priority Data

Sep. 6, 1984 [FR] France ............................... 84 13704

[51] Int. Cl.[4] ............................................... H02B 1/08

[52] U.S. Cl. .................................... 361/394; 361/396; 220/4 C; 220/306; 200/307

[58] Field of Search ..................... 200/307, 50 C, 294; 361/331, 380, 396, 393, 394, 412, 420, 426; 339/91 R, 91 P, 17 N; 220/4 C, 4 P, 306; 439/717

[56] References Cited

U.S. PATENT DOCUMENTS

| | | | |
|---|---|---|---|
| 2,695,723 | 11/1954 | Waterman | 220/4 E |
| 2,744,650 | 5/1956 | Woessner | 220/4 E |
| 4,029,929 | 6/1977 | Frank | 200/307 |
| 4,295,181 | 10/1981 | Chang | 361/394 |
| 4,481,492 | 11/1984 | Borne | 335/164 |

FOREIGN PATENT DOCUMENTS

| | | | |
|---|---|---|---|
| 2517114 | 12/1983 | France . | |
| 2569899 | 3/1986 | France | 200/307 |

*Primary Examiner*—G. P. Tolin
*Attorney, Agent, or Firm*—Sughrue, Mion, Zinn, Macpeak & Seas

[57] ABSTRACT

The invention relates to modular housings for electrical apparatus distributed between the aligned and superposed modules (1) of the housing, which modules are assembled by means of fixed transverse catches (3) and flexible longitudinal lugs (2) which are provided with catch-hooking windows (4). The catches (3) are each provided with an inlet slope facilitating lug sliding when the modules are stacked, they also include snap-fitting chamfers (14) enabling the modules to be reversibly hooked together, together with retaining ramps (7) enabling the modules to be positively locked together. The thrust rims (6) of the windows can pass from the snap-fitting chamfers (14) to the retaining ramps (7) only by applying external pressure to the free ends of the lugs so as to cause the lug material to creep.

5 Claims, 4 Drawing Figures

MODULAR ASSEMBLY FOR HOUSING ELECTRICAL APPARATUS

The present invention relates to modular housings for containing small electrical apparatuses distributed between the aligned and superposed modules which constitute the housings.

It is conventional to house small electrical apparatuses in housings made up from superposed modules which are fixed relative to one another and in which the electrical members are distributed. One example is given by the rotary electrical switches having superposed contact wafers as described, for example, in the Applicants' French patent No. 2517114 and corresponding U.S. Pat. No. 4,481,492.

In known manner, the modules of such housings are exactly positioned relative to one another by parts thereon penetrating into corresponding recesses of the modules with which they are to be coupled. These parts are conventionally constituted by pegs, lugs, or wall portions and they often provide a keying function or a locking function in addition to positioning per se.

Two superposed modules of a housing used conventionally to be rigidly assembled by bolting using a screw passing through the modules parallel to their stacking axis, and it is presently considered more advantageous to fix modules to one another by hooking flexible lugs or hooks on one module over fixed catches or rims on the other.

The lugs or hooks are flexible by virtue of their shapes, their sizes, and the nature of the materials from which they are made.

In known embodiments, it is sometimes possible after the apparatus has been assembled, or even after it has been installed, to displace the lugs or hooks unintentionally from the catches or rims with which they are engaged, in particular when said lugs or hooks are on the outside of a modular housing. This can be a drawback both during assembly and after the equipment has been installed, in which case there are additional safety-related risks.

However, this possibility of separating the fastening members also makes it possible to disassemble the modules constituting a housing, in particular during assembly, and thereby enables modifications to be performed on defective housings, in particular if discovered during assembly.

The present invention thus proposes a modular housing whose assembly enables the above-mentioned drawback to be avoided while still retaining the above-mentioned possibility of modifications.

The modular housing in accordance with the invention is provided for electrical apparatus which is distributed between the aligned and superposed modules of the housing, which modules are assembled to one another along an alignment axis by means of fixed transverse catches and flexible longitudinal lugs provided with catch-hooking windows, the lug windows of each module being threaded over the catches on the next module in the alignment when the housing is assembled.

According to a characteristic of the invention, each catch includes: an inlet slope facilitating lug-sliding thereover when the modules are stacked; a snap-fitting chamfer for providing reversible hooking between modules by resilient thrust between a rim of the window on said chamfer due to the window-containing lug being bent by the corresponding catch; and a contiguous retaining ramp enabling the modules to be rigidly locked together by positively thrusting the window rim against the retaining ramp after plastically deforming the lug including said window by pressing said lug against the catch by means of strong external transverse pressure, the stacking tolerances between modules being such that the rims of the windows bear against the snap-fixing chamfers without being able to come into contact with the retaining ramps of their own accord.

The following description of the invention, its characteristics and its advantages is made with reference to the figures listed below.

As mentioned above, FIG. 1 shows four modules 1A, 1B, 1C and 1D of a modular housing for receiving small electrical equipment, e.g. a switch having a stack of contact wafers controlled by a common control shaft. Reference can be made, for example, to French patent No. 2517114 and corresponding U.S. Pat. No. 4,481,492 as mentioned above for details of such housings or apparatus which are not described herein, insofar as these details do not directly concern the present invention.

Figure 1:
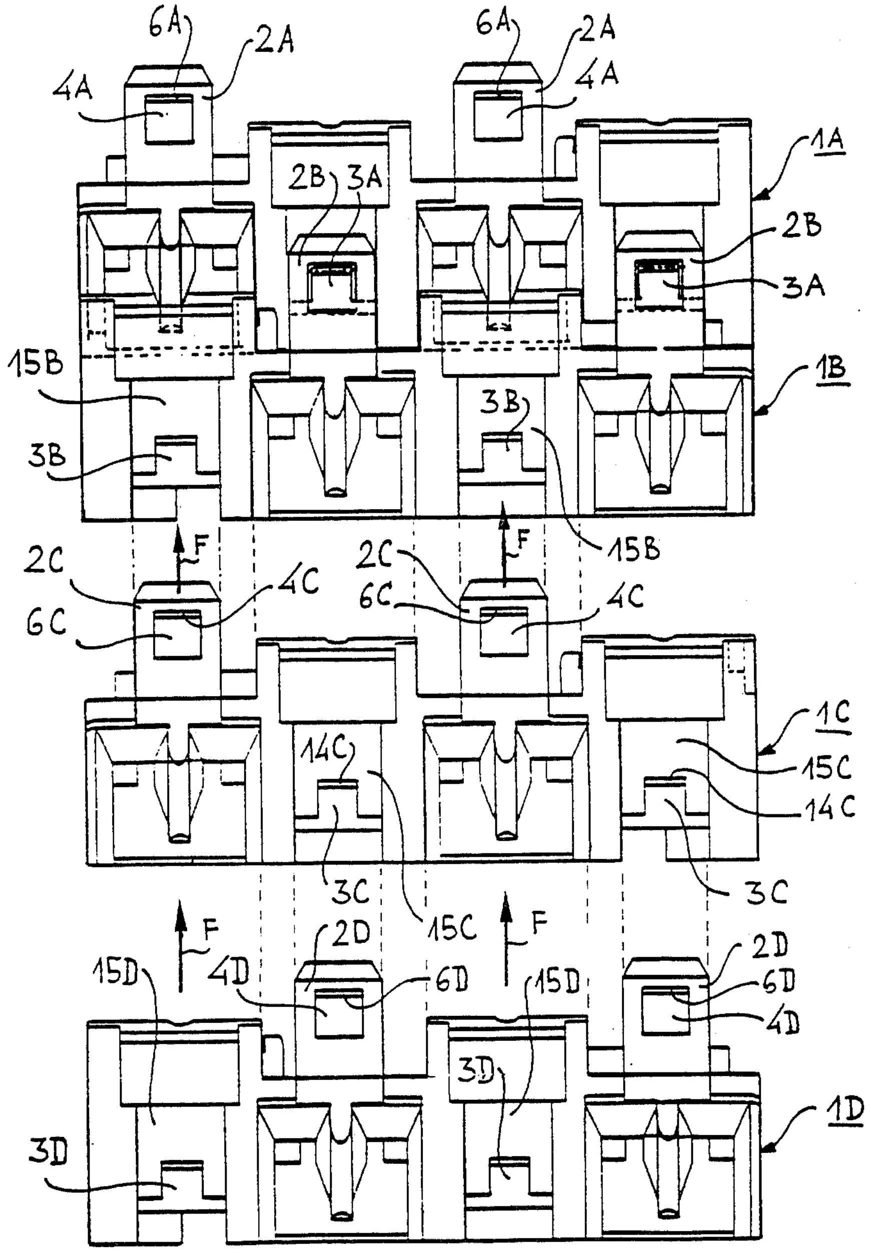
FIG. 1 is a front view of an embodiment of complementary modules intended to form a modular housing in accordance with the invention.

The modules 1, which are conventionally made of molded insulating material, such as a polycarbonate, are intended to be superposed on one another in alignment along a single direction symbolized by arrows F in FIG. 1. It can thus be seen that two modules 1A and 1B are in the assembled position, and that two modules 1C and 1D are placed in alignment prior to assembly.

It should be observed in this embodiment that the modules 1A and 1C are identical to each other and are complementary to the modules 1B and 1D, which are likewise identical to each other. Although this arrangement is not essential, it is common practice in order to reduce the overall bulk of the assembled housing and also for reasons concerning the positioning of the electrical apparatus which reasons are not described herein.

Two superposed modules, and consequently in this case two complementary modules such as 1A and 1B, or 1B and 1C, or 1C and 1D, are assembled by hooking fixing lugs 2 carried by one of the two modules over catches 3 carried by the other. The catches 3 of one module are fixed and project transversely relative to the alignment direction F. The fixing lugs 2 of a module which are provided with windows 4 for hooking over the catches 3 of another module, are flexible and are disposed longitudinally along the alignment direction F in such a manner as to slide over the catches 3 of the other module when the modules are brought together along the alignment direction F.

Figure 3:
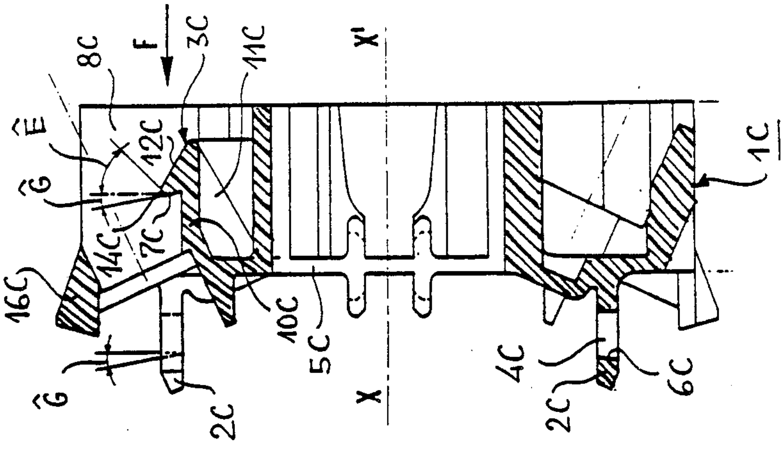
FIG. 3 is a staggered section on a line III—III through the module shown in FIG. 2.
Figure 2:
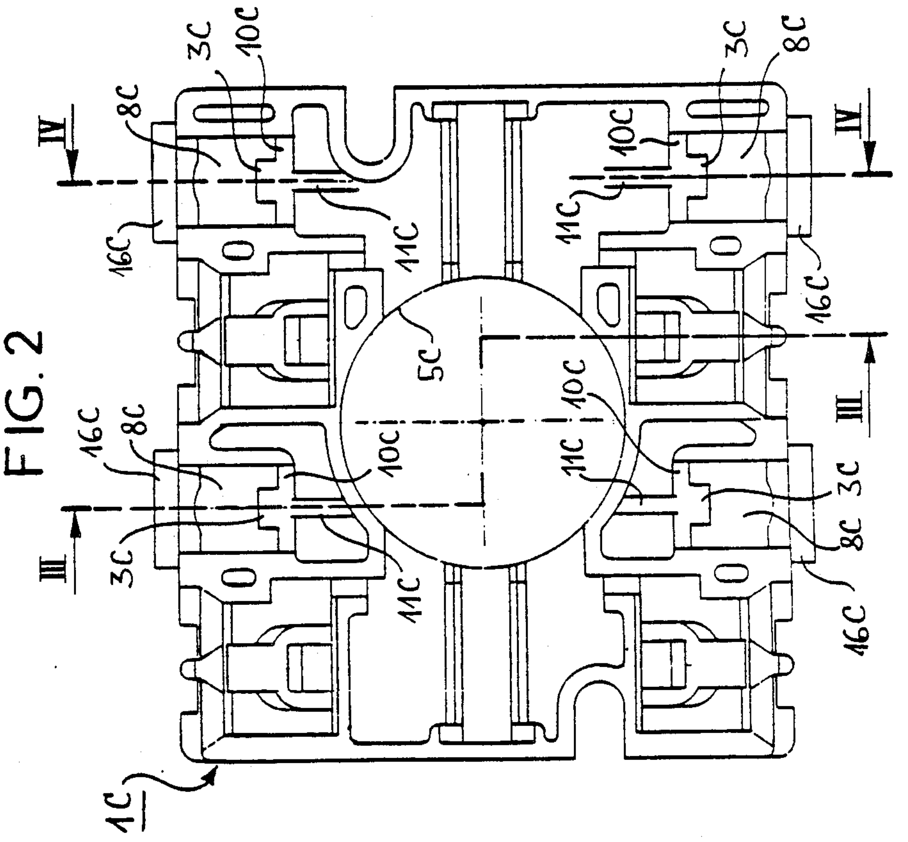
FIG. 2 is a plan view of the module shown in isolation in the middle of FIG. 1.

In the example shown here, where the modules have rectangular top and bottom faces, as can be seen from the plan view of FIG. 2, the fixing lugs and the catches are symmetrically disposed about a mid plane containing the mid longitudinal axis XX' of the module (see FIG. 3). However, it must be understood that a different disposition of fixing lugs and catches could be used, in particular with modules of circular section for which a circular disposition is generally preferable.

In the example shown, each module 1 has two pairs of fixing lugs 2 which are parallel and symmetrically disposed as mentioned above, the fixing lugs of two complementary modules being offset relative to one another parallel to the mid plane of symmetry, so as to be parallel but not aligned in two assembled complementary modules.

Naturally, the corresponding fixing lugs of assembled modules could be aligned (not shown here), in particular when selecting an alternative embodiment in which identical modules are superposed.

In the embodiment shown, the lugs 2 of a module 1 which are at least roughly rectangular in section have a degree of flexibility perpendicularly to the plane relative to which they are symmetrical, and are disposed to project from an outer face 5 (called the top face of the module), which face is a transverse face relative to the mid longitudinal axis XX'. The lugs 2 are preferably disposed well in from the perimeter defined by said top outer face 5 so as to be situated inside the housing which includes the module of which they are a part.

The position of the lugs 2 on the modules naturally determines the position of the catches 3 which they are to hook through their windows 4.

These windows (which are rectangular in the present example) are each provided close to the free end of the corresponding lug 2, and they include, in particular, a thrust rim 6, such as 6C in FIG. 3, provided close to said free end and intended to co-operate with a retaining ramp 7 such as the ramp 7C provided on the catches 3.

These catches 3 which project transversely towards the outside of the modules which contain them are located inside these modules in recesses 8 which are open to the outside at least adjacent to the hooking zone between a lug and a catch in order to allow external pressure means such as a punch (not shown here) to be passed through.

Figure 4:
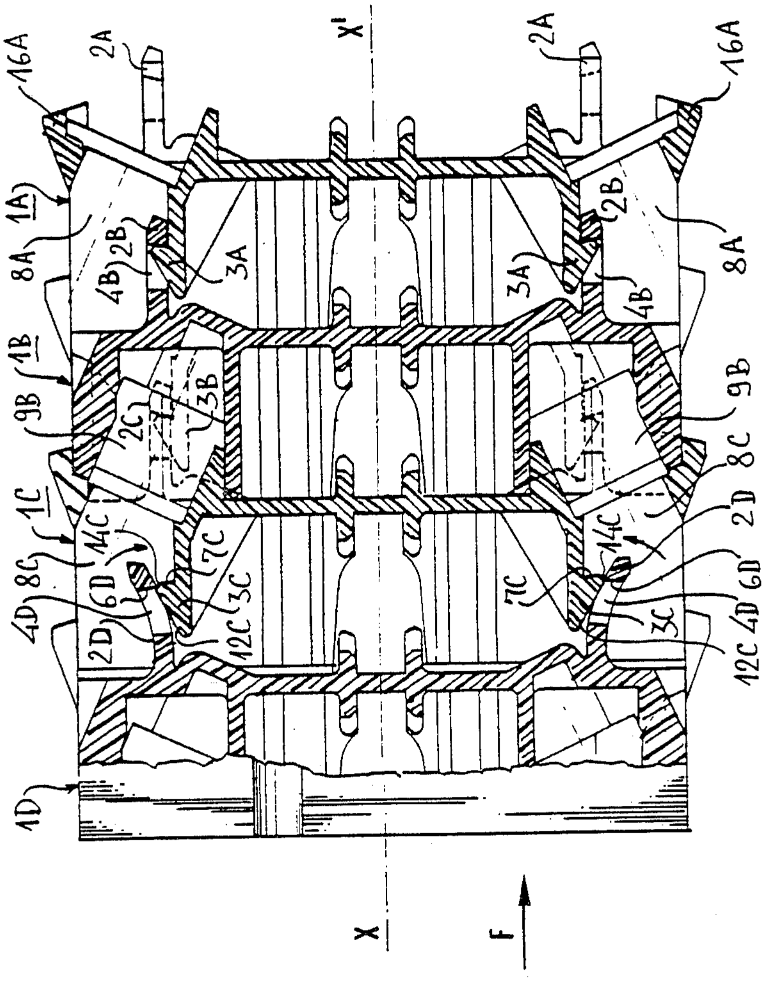
FIG. 4 is a section through all four assembled modules taken on a line IV—IV through the FIG. 2 module.

In the example shown, the recesses 8 in a module each lie in the prolongation of recesses 9 provided in the superposed complementary module for electrical connections (not shown), e.g. the recesses 8C and the module 1C lie in the prolongation of recesses 9B in the superposed module 1B (see FIG. 4).

The transverse catches 3 are disposed on walls 10 such as the wall 10C in FIGS. 2 and 3 which are parallel both to the mid plane symmetry of the module and also to the lugs 2 in such a manner that the lugs 2 of a module are applied against the walls 10 of the module having the catches 3 with which they are engaged, when the modules are rigidly assembled to one another.

In the example shown, the walls 10 are made rigid by ribs 11, such as the ribs 11C, which are situated on the other side of the walls relative to the lugs 2 of the coupled complementary module.

Each transverse catch 3 of a module projects outwardly from the wall 10 from which it projects into the recess 8 in which it is contained in such a manner as to make it possible to hook it to a lug from another module with which the catchcarrying module is superposed.

In accordance with the invention, this hooking operation comprises two stages enabling, in order: firstly, a reversible hooking engagement between the two modules; and then rigidly locked assembly of these modules. This is made possible by the special design of the catches 3.

When two aligned complementary modules 1 such as 1C and 1D are assembled by bringing the modules together, the lugs 2 of one of the modules slide over the catches 3 of the other, and this sliding action is facilitated firstly by guiding slideways 15 (FIG. 1) directing the lugs towards the catches, and secondly by the small inclination of the inlet slopes 12 provided on the catches to direct the free ends of the lugs to a level enabling the windows to hook thereto: firstly, over a snap-fitting chamfer 14 provided on each catch; and then secondly against the retaining ramp 7 which serves to lock the assembled modules together.

The snap-fitting chamfers 14 which are contiguous with the inlet slopes 12 at the thickest portion of the catches 3 slope the other way to these inlet slopes so as to facilitate the hooking of the thrust rims 6 of the windows 4 over the catches, for example they may form an angle E of 45° relative to the walls 10.

The tolerances for stacking modules 1 on one another are chosen in such a manner as to position the thrust rim 6 of the windows of the lower module level with the snap-fitting chamfer 14 of the catches of the upper module superposed thereon, e.g. the rims 6D level with the snap-fitting chamfers 14C for the modules 1C and 1D shown in FIG. 4.

Given that sliding the flexible lugs 2 of one module over the inlet slopes 12 of the catches of a superposed complementary module tends to bend the free ends of the lugs outwardly as the modules move together, there is a first and reversible hooking effect between the thrust rims 6 of the windows in the lugs 2 and the snap-fitting chamfers 14 of the catches 3 by virtue of the resilient return force caused by the lugs being bent.

In a preferred embodiment of the invention, the stacking clearances are kept sufficiently small to ensure that thrust rims remain on the snap-fitting chamfers regardless of the longitudinal pressure which may be exerted between two superposed modules during assembly, thereby ensuring that this first assembly operation is reversible.

The retaining ramps 7 of the catches are contiguous with the snap-fitting chamfers 14 and are oriented in the same direction as the inlet slopes 12 of the catches 3 on which they are provided, their slope is much greater than the inlet slope so as to provide positive locking of the thrust rims 6 of a window when a window is brought thereagainst, with the angle G being about 10°, for example.

The free ends of the lugs 2 need to be pressed against the catches by means of an external tool (not shown) of the punch type after the modules have been brought together by the abovedescribed reversible assembly operation. Such pressure causes the lug material to creep and thus enables the thrust rims 6 to pass over the junction between the snap-fitting chamfer 14 of a catch and the retaining ramp 7 of the same catch, and to be locked against said retaining ramp, as shown by the assembly of modules 1A and 1B in FIG. 4. The thrust rims 6 and the retaining ramp 7 are preferably identical in inclination.

The creep caused in the lug material by pressure from an external tool varies slightly as a function of the clearance to be taken up between the modules, and thereby allows any initial clearance to be compensated.

The outwardly directed opening provided in the recesses 8 allows a punch to pass perpendicularly to the longitudinal axis of the modules in order to lock the lugs on the catches.

Access to the free ends of the lugs 2 is limited by wall elements 16 placed at the outside of the modules, e.g. elements 16A in FIG. 4, once the modules 1 have been locked together. This considerably reduces any risk of involuntary separation of the modules of a housing and discourages attempts at disassembly by non-specialized personnel.

We claim:

1. A modular assembly for housing electrical apparatus comprising: aligned and superposed modules (1); said modules being assembled to one another along an alignment axis, each module including interengaged, fixed, rigid transverse catches (3) and flexible longitudinal lugs (2) on opposite sides thereof, said lugs facing said catches and being provided with windows (4) hooking on said rigid catches with the lug windows of aligned modules threaded over said catches carried by the following module in the alignment, said assembly being characterized in that each rigid catch (3) includes: an inlet slope (12) facilitating the sliding of a lug (2) thereover with the modules stacked on one another; a snap-fitting chamfer (14) effecting reversible inter-module hooking of a rim (6) of a lug window (4) resiliently thrust against said chamfer (14) when said flexible window-containing lug is bent by contact with a corresponding rigid catch; and a contiguous retaining ramp (7) rigidly locking the modules together with the rim (6) of a window (4) thrust against the retaining ramp (7) after plastically deforming the window-containing lug (2) upon pressing of said lug over the catch (3) under high pressure; and wherein the inter-module stacking tolerances are such that the window rims (6) press against the snap-fitting chamfers (14) without of their own accord being able to press against the retaining ramps (7), and wherein plastic deformation of said rim (6) serves to take up any play which may exist between the stacked modules.

2. A modular assembly according to claim 1, wherein the catches (3) and the hooking lugs (2) of adjacent modules are disposed inside the assembly in recesses (8) of each module, each of which is common to a lug and to a catch within the housing constituted by the assembly-constituting modules (1), each recess (8) having an opening to the outside level with the hooking zone between the lug and the catch which it contains.

3. A modular assembly according to claim 2, wherein that portion of each recess (8) common to a lug and to a catch which is open to the outside lies in the prolongation of a recess (9) for electrical connection.

4. A modular assembly according to claim 2, wherein the catches (3) and the hooking lugs (2) are disposed in pairs on each module (1) and symmetrically about a mid plane containing the longitudinal stacking axis of the module which includes said catches and said lugs.

5. A modular assembly according to claim 2, wherein access to the free ends of the lugs (2) of the superposed modules (1) which are locked together by said lugs engaging the corresponding catches (3) of other modules, is limited by wall elements (16) placed on the outside of the modules (1) adjacent to said recesses (8).

* * * * *